Patented July 16, 1940

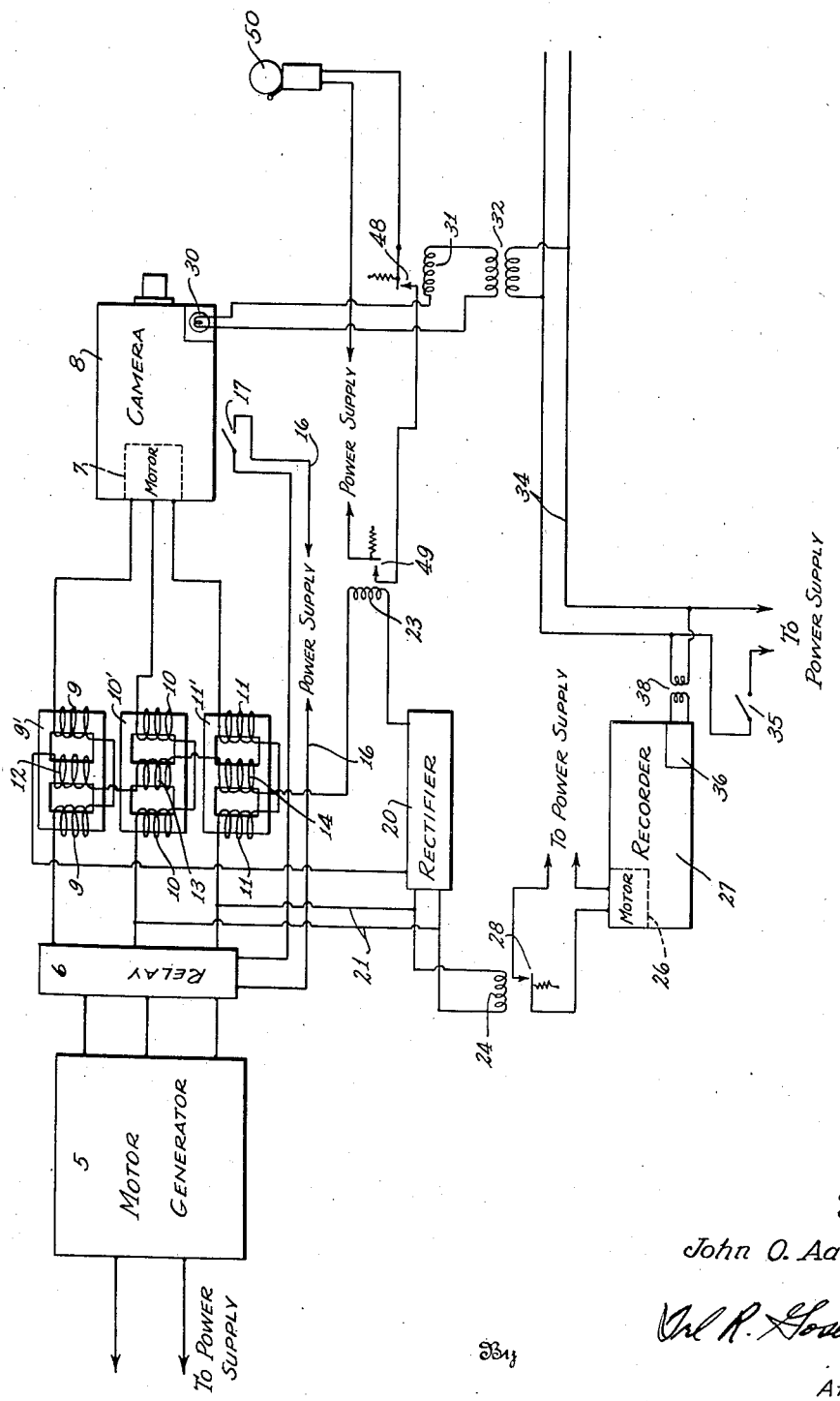

2,208,404

UNITED STATES PATENT OFFICE 2,208,404

MOTOR CONTROL AND SIGNAL CIRCUIT

John O. Aalberg, Los Angeles, Calif., assignor to Radio Keith Orpheum Corporation, a corporation of Maryland Application September 24, 1937, Serial No. 165,524

9 Claims. (Cl. 88—16.2)

This invention relates to a motion picture and sound recording system and particularly to a motor control circuit for regulating the starting voltage impressed upon the motors and to a signaling circuit cooperating therewith and with other portions of the system to indicate the condition thereof.

It is well known that motion picture cameras and sound recorders are driven at a predetermined constant speed generally by the use of synchronous motors. In starting these motors it is particularly desirable that the acceleration be smooth and uniform to eliminate jerks or too rapid acceleration, which may possibly damage the film sprocket perforations or cause deleterious loops to form between the different driving elements. Smooth starting has been accomplished formerly by the manual variation of resistances usually employed in the power supply circuits. The present invention eliminates this manual operation and makes the voltage variation automatic and dependent upon the characteristic of an electronic device.

In the use of such automatic starting controls it is desirable that the condition thereof be known before any considerable amount of film has been run through the picture and sound cameras. For instance, failure of the voltage control circuit may cause the motor to operate at an incorrect speed. This is a serious condition, since it is well known that where sound is being simultaneously recorded with the picture by separate machines, both the camera and recorder motors must advance both negatives at the same linear speed. As the condition of a circuit is not detectable by general observation, the present invention provides an indicator for showing whether or not the voltage control portion of the system has operated properly.

In general motion picture practice as soon as the picture negative and sound negative are running at the same linear speed, they are simultaneously marked in some manner to provide means for properly combining the two records upon a single film at a later time. Several methods of and means for accomplishing this synchronizing of picture negative and sound negative have been suggested, the method used in the present invention employing a lamp for fogging the picture negative simultaneously with the disturbing of the sound track by the noise reduction portion of the sound modulator.

As this system of marking involves the use of electrical elements, it is also subject to breakdown in the form of burnt out lamps or open circuits or failure of the power supply. The invention, therefore, is further directed to a signaling system which will not only indicate that the voltage starting circuit is operating properly, but also simultaneously indicate that the marking of the negatives has been properly accomplished.

An object of the present invention, therefore, is to start a synchronous motor with a predetermined acceleration.

Another object of the invention is to automatically control the voltage upon a synchronous motor in accordance with a predetermined characteristic.

A further object of the invention is to control the impressed voltage upon a synchronous motor by varying the reactance in the supply lines by saturation of the cores of the reactors.

A still further object of the invention is to vary the control voltage in accordance with the time-current characteristic of a rectifier which supplies the saturation current to the cores of the reactance coils and to indicate that the saturation current is being applied.

A still further object of the invention is generally to indicate the condition of the power supply and the control circuits of the system.

A still further object of the invention is to automatically signal to those at a camera location that the proper voltage is being applied to the camera motor and that the synchronizing marking circuit has properly functioned.

In the past, it was common to have a sound operator at the camera, which was usually on a sound stage, and a sound operator at the recorder, which was usually at a distant point. These operators would signal back and forth to start the camera and recorder and then signal to each other when the camera and recorder were ready for a take. The present invention eliminates the services of the sound operator at the camera, since all that is now required is that the cameraman press a switch button which starts the camera and also starts the sound recorder at the distant point. When this has been accomplished and sufficient time has elapsed for the motors to reach their running speed, the sound operator at the recorder presses a switch which will operate a signal observable to and which will indicate to the person in charge at the camera or to anyone that the motor control circuit is functioning properly and no failure occurred in the marking circuit.

Although the novel features which are believed to be characteristic of this invention will be pointed out with particularity in the claims appending herewith, the manner of its organization and the mode of its operation will be better understood by referring to the following description read in conjunction with the accompanying drawing forming a part thereof, in which the single figure is a schematic diagram of the motor control and signaling circuit of the invention embodied in a sound picture recording channel.

Referring now to the drawing, a motor generator 5 may be energized from any two- or three-phase power system, the output of the generator being any desired type of power such as three-phase, 48 cycles at 220 volts. The motor generator is connected by the usual three-phase conductors to a switch relay 6 which controls the connection of the generator to a camera motor 7 of a camera 8. Connected in the supply leads are reactors 9, 10 and 11 wound on the end legs of iron cores 9', 10' and 11', respectively. On the middle leg of each core and connected in series are windings 12, 13 and 14, which may also be connected in parallel if desired. The relay 6 is energized over conductors 16 from a power supply as shown, the connection thereof being controlled by a switch 17 located at the camera.

Across one phase of the three-phase supply from generator 5 between the relay 6 and the reactors there is connected a rectifier 20 by conductors 21, this rectifier being any well known type having a sloping current-time thermal-inertia characteristic. That is, the output current of the rectifier does not reach its full value immediately upon energization since it takes time for the cathode or cathodes to become heated to their normal operating condition. The rectifier of the present invention is a full-wave rectifier employing two Rectigon S-289415-C tubes, although substantially all rectifier tubes have some thermal-time delay. The output of the rectifier is connected in series with windings 12, 13 and 14 of the reactors 9, 10 and 11 and with a relay winding 23.

The circuit 6, 16 and 17 also controls the starting of a sound recorder motor 26 of a recorder 27 by the closing of contacts 28 of a relay 24, the latter being energized from any phase of the supply energy for picture camera motor 7. The motor 26 may be energized by any suitable power source as shown, or from the same source of power as camera motor 7, it being understood that a reactance circuit similar to that shown for the camera motor 7 may also be used for the motor 26.

The operation of the reactor circuit for voltage control is as follows: Upon closing of the switch 17 at the picture camera, the relay 6 connects the generator 5 to the camera motor 7 through windings 9, 10 and 11. Upon the closing of the contacts in relay 6, the impedance of reactors 9, 10 and 11 is at its highest value, due to the reluctance of the iron cores within the magnetic circuits formed by the windings. This produces a maximum voltage drop which may be designed to permit as much as a 50% reduction in starting voltage. Simultaneously, however, with the closing of the contacts of relay 6, the rectifier 21 is energized over conductors 21, and the rectifier, following its thermal characteristic, begins to saturate the cores 9', 10' and 11' of the reactors, thus smoothly and uniformly reducing their reactance to a point where the voltage drop across them may be in the neighborhood of 2% of the full-line voltage. It is thus seen that a particularly desirable starting characteristic is obtained through the thermal-time lag of the rectifier. This provides a smoothly increasing starting voltage which permits the motor to start without any excessive jerk and to then accelerate smoothly as the voltage builds up to the required full-load value. During this period the recorder motor 26 has been energized and is brought up to speed by the closing of contacts 28.

Referring now to the marking circuit of the system, a lamp 30 is shown in camera 8 which is placed at any convenient point for fogging the picture negative when the lamp 30 is energized. In series with the lamp 30 is a relay winding 31 and the secondary of a transformer 32. The primary of transformer 32 is connected to heater busses 34 which are energized from a convenient power supply as shown, the energization being controlled by a switch 35 located at the recorder 27. Within the recorder 27 is a light modulating system indicated at 36, this system being of any suitable type. The modulator is connected to the heater busses 34 through a transformer 38. The type of modulator used with the present invention employs a galvanometer with biased noise reduction shutters, the closing of switch 35 removing the bias and thus placing a synchronizing mark on the sound negative simultaneously with the fogging of the picture negative by lamp 30. It is to be understood that any connection to the light modulator 36 which disturbs it sufficiently to fog the film will operate satisfactorily with the present invention.

Thus, to mark the films when they have reached the same constant speed the switch 35 is closed by the recorder operator. The closing of the switch connects the power supply to the heater busses, which energizes the lamp 30 to mark the picture negative and simultaneously removes the bias from the shutters to mark the sound negative. In energizing the lamp 30, the relay 31 is energized, thus closing contacts 48 thereof. When the required current value to properly saturate cores 9', 10' and 11' is passing through relay 23, it is energized, thus closing contacts 49. The closing of contacts 48 and 49 energizes a signal circuit from an appropriate power supply, as shown, this circuit having an indicator such as a bell 50 therein, the bell 50 being located at the camera to indicate to those on the set that everything is in readiness for a take.

It is to be noted that should the rectifier fail to provide the proper current through windings 12, 13 and 14 to increase the voltage on the motor 7 to its proper value or should the lamp 30 at the camera be burnt out or fail to function for other reasons, the bell 50 will fail to ring and thus it is known that these two vital portions of the system are not in working order, and the apparatus may be stopped. The signaling system, therefore, saves film in the picture camera, film in the sound recorder and time of the actors and crew. Furthermore, the sound operator at the camera is eliminated, while the starting system eliminates the manual operation of voltage control.

Although separate power supplies have been shown for the control circuit of relay 6, the signal circuit and the heater busses, it is well understood that these circuits may be connected to the same power source.

Furthermore, additional indicating devices may be connected in series or parallel with bell 50 for notifying others, such as the recorder operator, that the system is in proper working condition and in readiness for a take.

I claim as my invention:

1. A recording system comprising a camera for exposing a picture negative, a second camera for exposing a sound negative, manually controlled means for simultaneously exposing a portion of each of said negatives, means for controlling the starting voltage on a motor of at least one of said cameras, and signaling means for indicating that the correct voltage is on said last-mentioned motor and that said manually controlled means has properly functioned to expose said picture negative simultaneously with said sound negative, said signaling means including a circuit energizable only during the simultaneous functioning of said voltage control means and said manually controlled means.

2. A picture and sound system comprising a picture camera having a motor therefor, a sound recorder having a motor therefor, a voltage control circuit for controlling the starting voltage on at least one of said motors, means for simultaneously marking a negative in said picture camera and a negative in said sound recorder, an indicating device and means for indicating on said device, the complete and simultaneous functioning of said voltage control circuit and said marking circuit, said last-mentioned means including a series circuit interconnecting said voltage control circuit, said marking means and said indicating device.

3. A system for starting a plurality of camera motors at separated locations, a source of power, means for connecting at least one of said motors to said source of power, means in said connection means for uniformly increasing the voltage on said motor during acceleration, means operated by said voltage control means when running voltage is impressed on said motor, a switch at one of said cameras for starting all of said motors, a switch at another of said cameras for controlling the recording of the synchronization of said motors, means energized by the operation of said last-mentioned switch, and means connected to said last-mentioned means and said voltage operated means and operative only during the proper functioning of said last-mentioned means and said voltage operated means.

4. A system in accordance with claim 3 in which said last-mentioned means and said voltage operated means comprise a series circuit and switches therein, said switches being operative by energization of said voltage operated means and said last-mentioned means.

5. A sound picture recording channel comprising a picture camera having a driving motor, a sound camera having a driving motor, a voltage control circuit for at least one of said motors, a relay in said voltage control circuit and energized thereby, means at said camera for controlling the starting of both of said camera motors, a plurality of means for simultaneously effecting the negatives in both of said cameras, means at said sound camera for controlling said plurality of means, a relay in said negative affecting means, an indicating device, and means for connecting both of said relays and said indicating device in a common circuit, said indicating device being operative only during the simultaneous operation of both of said relays.

6. A sound picture recording channel comprising a picture camera, a sound camera, means located at said picture camera for marking said picture negative film, means located at said sound camera for marking said sound negative film, a circuit adapted to be periodically energized for operating both of said marking means simultaneously during the running periods of said cameras, and means for indicating the successful operation of said marking means, said last-mentioned means including an independent normally open circuit which is closed by the energization of said operating circuit for said marking means.

7. A sound picture recording channel comprising a picture camera, means for marking the negative within said picture camera, a sound camera, means for affecting the sound negative within said sound camera, a circuit adapted to be periodically energized for simultaneously operating both of said marking means during the running periods of said camera, a motor in said picture camera, means for energizing said camera motor, and means for indicating the successful operation of said picture negative marking means, said sound negative affecting means during the proper energization of said camera motor, said last-mentioned means including an independent normally open circuit which is closed only when said marking means, said affecting means and said energization means have properly functioned simultaneously.

8. A sound picture recording channel comprising a camera, a motor for operating said camera, a sound camera, a motor for operating said sound camera, marking means for said picture camera, means for affecting the sound picture negative, a circuit adapted to be periodically energized for simultaneously operating said camera marking means and said sound negative affecting means, and an independent, normally open indicator circuit, said indicator circuit being energized only upon simultaneous energization of said picture camera marking means, said sound negative affecting means and at least one of said motors.

9. A sound recording channel comprising a picture camera, a lamp within said camera, a sound camera, a sound recording modulator within said sound camera, a circuit interconnecting said lamp and said modulator for the energization thereof, means for energizing said interconnecting circuit, an indicating device, a second circuit adapted to be controlled from said interconnecting circuit for operating said indicating device, and means interconnecting said circuits, said indicating device operating only upon the complete and simultaneous energization of said first-mentioned circuit.

JOHN O. AALBERG.